United States Patent
Cmielowski et al.

(10) Patent No.: US 12,468,979 B2
(45) Date of Patent: Nov. 11, 2025

(54) EARLY STOPPING OF ARTIFICIAL INTELLIGENCE MODEL TRAINING USING CONTROL LIMITS

(71) Applicant: International Business Machines Corporation, Armonk, NY (US)

(72) Inventors: Lukasz G. Cmielowski, Cracow (PL); Daniel Jakub Ryszka, Cracow (PL); Wojciech Sobala, Cracow (PL); Gregory Bramble, Larchmont, NY (US)

(73) Assignee: International Business Machines Corporation, Armonk, NY (US)

( * ) Notice: Subject to any disclaimer, the term of this patent is extended or adjusted under 35 U.S.C. 154(b) by 1109 days.

(21) Appl. No.: 17/460,689

(22) Filed: Aug. 30, 2021

(65) Prior Publication Data
US 2023/0061222 A1 Mar. 2, 2023

(51) Int. Cl.
*G06N 20/00* (2019.01)
(52) U.S. Cl.
CPC .................................. *G06N 20/00* (2019.01)
(58) Field of Classification Search
None
See application file for complete search history.

(56) References Cited

U.S. PATENT DOCUMENTS

| | | |
|---|---|---|
| 2019/0188536 A1 | 6/2019 | Lei |
| 2020/0167691 A1 | 5/2020 | Golovin |
| 2020/0372342 A1 | 11/2020 | Nair |
| 2023/0108808 A1* | 4/2023 | Lerman ................ G06N 5/01 717/104 |

FOREIGN PATENT DOCUMENTS

| | | | | |
|---|---|---|---|---|
| JP | 2023-035911 A | 3/2023 | | |
| WO | WO-2005024718 A1 * | 3/2005 | .......... | G06N 3/0481 |

OTHER PUBLICATIONS

Brownlee, Jason; Use Early Stopping to Halt the Training of NeuralNetworks at the Right Time; Aug. 25, 2020; MachingLearningMastery.com https://machinelearningmastery.com/how-to-stop-training-deep-neural-networks-at-the-right-time-using-early-stopping/ (Year: 2020).*

(Continued)

*Primary Examiner* — Alan Chen
(74) *Attorney, Agent, or Firm* — Scott Dobson (57) ABSTRACT

Disclosed herein is a method of training an artificial intelligence model that comprises an iterative training loop. Said iterative training loop comprises: receiving a current set of training data; dividing said current set of training data into a predetermined number of training data subsets; sequentially training said artificial intelligence model with each of said predetermined number of training data subsets using a training portion and calculating a performance metric using a validation portion; and comparing performance metrics from a previous iteration of said iterative training loop to said calculated performance metric to determine if an improving performance metric condition is met. Said method further comprises halting said iterative training loop unless said improving performance metric condition is not met at least once within a predetermined number of previous iterations.

25 Claims, 4 Drawing Sheets

(56) References Cited

OTHER PUBLICATIONS

Mahsereci et al., Early Stopping without a Validation Set, arXiv:1703.09580v3 [cs.LG] Jun. 6, 2017; Total pp. 16 (Year: 2017).*
Jaderberg et al., Population Based Training of Neural Networks, arXiv:1711.09846v2 [cs.LG] Nov. 28, 2017; Total pp. 21 (Year: 2017).*
Li et al., Hyperband: A Novel Bandit-Based Approach to Hyperparameter Optimization, Journal of Machine Learning Research 18 (2018); pp. 1-52; (Year: 2018).*
"Making Developers Awesome at Machine Learning—Frequently Asked Questions", Machine Learning Mastery, <https://machinelearningmastery.com/faq/single-faq/how-do-i-use-early-stopping-with-k-fold-cross-validation-or-grid-search/>, © 2020 Machine Learning Mastery Pty. Ltd., 15 pages.
"Metrics and scoring: quantifying the quality of predictions", Chapter 3.3, scikit-learn.org, downloaded from the Internet on Jul. 12, 2021, 32 pages, <https://scikit-learn.org/stable/modules/model_evaluation.html>.
Binford, Ashley, "Predictive Early Stopping—A Meta Learning Approach", towards data science, <https://towardsdatascience.com/predictive-early-stopping-a-meta-learning-approach-90561f0e9454>, Apr. 22, 2020, 9 pages.

* cited by examiner

EARLY STOPPING OF ARTIFICIAL INTELLIGENCE MODEL TRAINING USING CONTROL LIMITS

BACKGROUND

The present invention relates to artificial intelligence models, and in particular to the training of artificial intelligence models.

Automated machine learning may be a process where a number of artificial intelligence models or estimators are trained. The artificial intelligence models may be ranked using a performance metric during validation of the artificial intelligence models. This has the advantage of making it easier to find an appropriate artificial intelligence model. Existing methods for training artificial intelligence models operate at considerably suboptimal efficiencies, as they do not leverage control limits to cease training when desirable performance metrics are met.

SUMMARY

In one aspect the invention provides for a method of training an artificial intelligence model. The method comprises an iterative training loop. The iterative training loop comprises receiving a current set of training data. The iterative training loop further comprises dividing the set of training data into a predetermined number of training data subsets. The training data subsets may also be referred to as k-folds. Each of the predetermined number of training data subsets is divided into a training portion and a validation portion. The training portion of the training data subset is used for further training the artificial intelligence model. The validation portion is used to check the performance of the artificial intelligence model after it has been trained with its respective training portion.

The iterative training loop further comprises sequentially training the artificial intelligence model with each of the predetermined number of training data subsets using the training portion. The sequential training of the artificial intelligence model comprises calculating a performance metric for the predetermined number of training data subsets using the validation portion. The iterative training loop further comprises calculating a training control limit from a mean of the performance metric for the predetermined number of training data subsets and a range of the performance metric for a predetermined number of training data subsets. The mean of these performance metrics can be calculated as well as a range such as between the largest and smallest value of the performance metric. This mean and the range of the performance metric can be used to calculate a training control limit. This training control limit may be used to evaluate the results of a subsequent duration of the iterative training loop.

The iterative training loop further comprises comparing the training control limit from immediately previous iteration of the iterative training loop to the mean of the performance metric for the predetermined number of training datasets to determine if an improving performance metric condition is met.

The method further comprises halting said iterative training loop unless the improving performance metric condition is not met at least once within a predetermined number of previous iterations.

According to a further aspect of the invention, the invention provides for a computer-readable storage medium having computer-readable program code embodied therewith. The computer-readable program code is configured to implement an embodiment of the method of training the artificial intelligence model.

According to a further aspect of the present invention, the invention provides for a computer system that comprises a processor and a memory storing machine-executable instructions. The execution of the machine-executable instructions causes the processor to implement a method according to an embodiment.

According to a further aspect of the present invention, invention provides for a computer program product comprising a computer-readable storage medium having a computer-readable program code embodied therewith. The computer-readable program code is configured to implement a method according to an embodiment.

According to a further aspect of the present invention, the invention provides for a computer program product. The computer program product comprises a computer-readable storage medium having stored on it an artificial intelligence model trained according to an embodiment of the method.

According to a further aspect of the present invention, the invention provides for a memory storing data for access by an application program being executed on a data processing system. The application program comprises an artificial intelligence model trained according to an embodiment of the method.

BRIEF DESCRIPTION OF THE DRAWINGS

In the following embodiments of the invention are explained in greater detail, by way of example only, making reference to the drawings in which.

DETAILED DESCRIPTION

The descriptions of the various embodiments of the present invention will be presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments may be beneficial because they may provide a means for reducing the computational burden associated with training an artificial intelligence model. If a model is not performing well, its training can be ended early, saving both time and computational effort.

Another benefit may be that adding the condition where the halting only happens if the improved performance metric condition is not met at least once within a predetermined number of previous iterations may provide for higher quality or more accurate artificial intelligence models. This may be because the training of an artificial intelligence model may temporarily plateau. If the artificial intelligence model has not been improving within the predetermined number of previous iterations, then likely the quality of the artificial intelligence model after training may not be sufficient and it can be safely halted or discarded.

The set of training data may be different or distinct from the current set of training data from a previous iteration of the iterative training loop. That is to say every time the training loop is iterated a new or different current set of training data is used. This means that as the iterative training loop is executed multiple times, the artificial intelligence model is further trained.

Each time the artificial intelligence model is checked with the validation portion it provides a data point as to the performance metric. Since the training data is divided into a predetermined number of training data subsets the number of times the metric is calculated is also the predetermined number.

Another potential benefit is that the training control limit can be used to define if the subsequent iteration is improving or not improving in quality.

In some examples, the first time the iterative training loop is executed there may be no training control limit. In this case, the training control limit may be ignored. In subsequent iterations the training control limit provides an objective measure of whether the training of the artificial intelligence model is improving with each iterative training loop.

In another embodiment the method further comprises training multiple artificial intelligence models simultaneously using the method of training an artificial intelligence model. For example, there may be a system where a large number of different types of models or parameters within an artificial intelligence model are varied to check or to search for the best artificial intelligence model. The method may enable models selected from the multiple artificial intelligence models which are not performing well to be stopped before they are fully trained. This may have significant benefits in reducing the amount of time to train the remaining multiple artificial intelligence models as well as freeing up additional computational resources for accelerating the process.

In another embodiment the method further comprises choosing a global control limit for each iteration of the iterative training loop. The global control limit is selected by choosing the control limit from the iterative training loop that indicates a best performance metric of the multiple artificial intelligence models. As the multiple artificial intelligence models are trained and a training control limit is selected for each of these models, the training control limit which indicates the best performance metric is chosen. In the next iteration all of the multiple artificial intelligence models are compared against this global control limit. The iterative training loop further comprises replacing the training control limit from an immediately previous iteration of the iterative training loop for each of the multiple artificial intelligence models with an immediately previous global control limit from the immediately previous iteration of the iterative training loop. This embodiment may have the benefit that there is a competition between the multiple artificial intelligence models. If a particular artificial intelligence model does not have a performance improvement in comparison to the global control limit for the predetermined number of times, then the training of this model is stopped. This may be beneficial in reducing the amount of artificial intelligence models that need to be trained.

In another embodiment the training control limit for each of the multiple artificial intelligence models during each iteration of the iterative training loop is calculated separately. In this embodiment the global control limit is not used. In this case, the multiple artificial intelligence models are each evaluated against their own individual performance.

In another embodiment an increasing value of the performance metric indicates better artificial intelligence model performance. The control limit is calculated as the mean of the performance metric plus the range of the performance metric multiplied by a constant. The constant may for example be identified or selected using a table of constants from a statistical process control chart.

In another embodiment a decreasing value of the performance metric indicates better artificial intelligence model performance. The control limit is calculated as a mean of the performance metric minus the range of the performance metric multiplied by a constant. The constant may again be selected from a table of constants for a statistical process control chart. In this embodiment the control limit may be a lower control limit.

In another embodiment the control limit is a statistical process control limit. It may for example be an upper control limit or a lower control limit for an x-bar graph from a statistical process control.

In another embodiment the performance metric is the accuracy.

In another embodiment the performance metric is the precision.

In another embodiment the performance metric is recall.

In another embodiment the performance metric is the area under a curve metric.

In another embodiment the performance metric is the true positive rate.

In another embodiment the performance metric is the true negative rate.

In another embodiment the performance metric is the false positive rate.

In another embodiment the performance metric is the sum of the true positive rate and the true negative rate both divided by a total sample size.

In another embodiment the performance metric is the mean squared error.

In another embodiment the performance metric is the F1 score.

In another embodiment the artificial intelligence model is a convolutional neural network. The training of the artificial intelligence model using the training data subsets is performed using a deep learning algorithm. This embodiment may be beneficial because it may provide for an efficient means of evaluating different topologies and training methodologies for convolutional neural networks. For example, hyper parameters or other values could be varied for a particular neural network and they could be trained and then evaluated using the iterative training loop. Models which perform poorly may be discontinued early.

In another embodiment the artificial intelligence model is a neural network.

In another embodiment the artificial intelligence model is a classifier neural network.

In another embodiment the artificial intelligence model is a convolutional neural network.

In another embodiment the artificial intelligence model is a Bayesian neural network.

In another embodiment the artificial intelligence model is a Bayesian network.

In another embodiment the artificial intelligence model is a Bayes network.

In another embodiment the artificial intelligence model is a naïve Bayes classifier.

In another embodiment the artificial intelligence model is a belief network.

In another embodiment the artificial intelligence model is a decision network.

In another embodiment the artificial intelligence model is a decision tree.

In another embodiment the artificial intelligence model is a support-vector machine.

In another embodiment the artificial intelligence model is a regression analysis.

In another embodiment the artificial intelligence model is a genetic algorithm.

In another embodiment the training of the multiple artificial intelligence models is performed such that each of the models may be freely selected from those mentioned above.

In another embodiment execution of the instructions causes the processor to train multiple artificial intelligence models simultaneously using the method of training the artificial intelligence model.

In another embodiment execution of the instructions causes the processor to choose a global control limit for each iteration of the iterative training loop. Execution of said instructions causes the processor to choose the control limit from the iterative training loop that indicates the best performance metric. The iterative training loop further comprises replacing the training control limit from an immediately previous iteration of the iterative training loop for each of the multiple artificial intelligence models with an immediately previous global control limit.

In another embodiment the training control limit for each of the multiple artificial intelligence models during each iteration of the iterative training loop is calculated separately.

Figure 1:
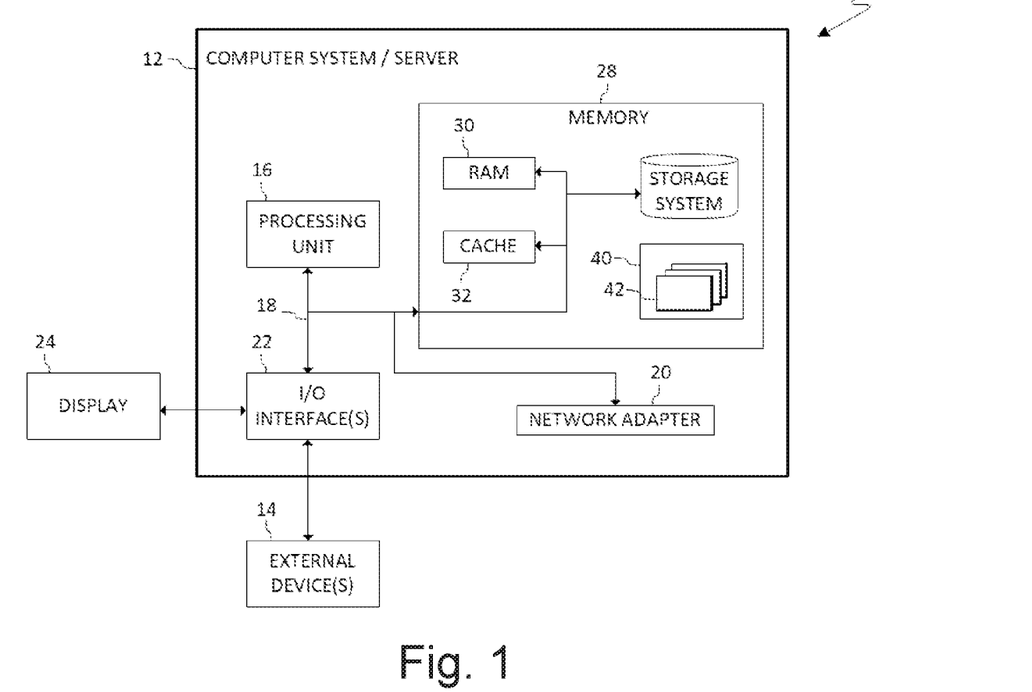
FIG. 1 illustrates an example of a computer system in accordance with at least one embodiment of the present invention.

Embodiments of the present invention may be implemented using a computing device that may also be referred to as a computer system, a client, or a server. Referring now to FIG. 1, a schematic of an example of a computer system is shown. Computer system 10 is only one example of a suitable computer system and is not intended to suggest any limitation as to the scope of use or functionality of embodiments of the invention described herein. Regardless, computer system 10 is capable of being implemented and/or performing any of the functionality set forth hereinabove.

In computer system 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computer system 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

A computer system such as the computer system 10 shown in FIG. 1 may be used for performing operations disclosed herein such as training an artificial intelligence module. Such computer system may be a standalone computer with no network connectivity that may receive data to be processed, such as a training data set for training an artificial intelligence module, through a local interface. Such operation may, however, likewise be performed using a computer system that is connected to a network such as a communications network and/or a computing network.

Figure 2:
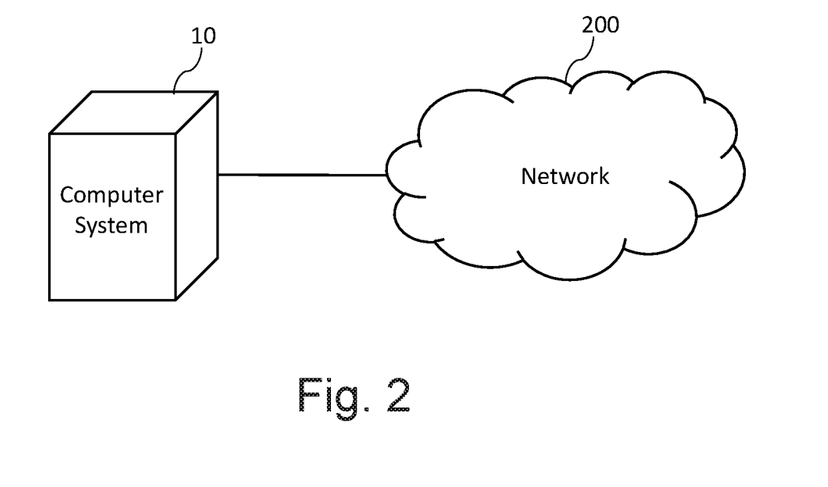
FIG. 2 shows an exemplary computing environment where the computer system of FIG. 1 is connected in accordance with at least one embodiment of the present invention.

FIG. 2 shows an exemplary computing environment where a computer system such as computer system 10 is connected, e.g., using the network adapter 20, to a network 200. Without limitation, the network 200 may be a communications network such as the internet, a local-area network (LAN), a wireless network such as a mobile communications network, and the like. The network 200 may comprise a computing network such as a cloud-computing network. The computer system 10 may receive data to be processed, such as a training data set for training an artificial intelligence model, from the network 200 and/or may provide a computing result, such as a trained artificial intelligence module after it has been trained using the training data set, to another computing device connected to the computer system 10 via the network 200.

The computer system 10 may perform operations described herein, entirely or in part, in response to a request received via the network 200. In particular, the computer system 10 may perform such operations in a distributed computation together with one or more further computer systems that may be connected to the computer system 10 via the network 200. For that purpose, the computing system 10 and/or any further involved computer systems may access further computing resources, such as a dedicated or shared memory, using the network 200.

Figure 3:
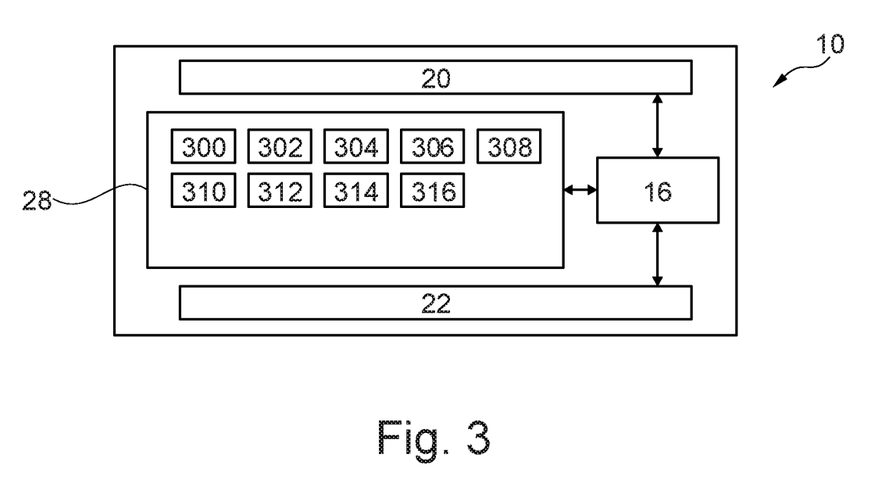
FIG. 3 illustrates a further example of a computer system in accordance with at least one embodiment of the present invention.

FIG. 3 illustrates an example of computer system 10. The computer system 10 illustrated in FIG. 3 is a representation of the computer system illustrated in FIG. 1. The processing unit 16 is shown as being connected to the network adaptor 20, the TO interface 22 and the memory 28. The memory 28 is intended to represent the various types of memory that may be accessible to the processing unit 16.

The memory 28 is shown as containing machine-executable instructions 300. The machine-executable instructions 300 enable the processing unit 16 to perform various computational and data processing tasks. For example, this may include the calculation of various averages and metrics as well as calculating control limits and implementing various algorithms for training artificial intelligence models. The memory 28 is further shown as containing an artificial intelligence model 302 which is going to be trained. The memory 28 is further shown as containing a current set of training data 304. During each iterative loop the current set of training data 304 is replaced with new training data. This for example may be provided to the memory 28 on each loop or it may be retrieved from an archive or database containing the training data.

The memory 28 is further shown as containing sets of training data which have been formed by dividing the current set of training data 304 into a predetermined number of groups or sets of the training data. These may also be referred to as k-folds. The memory 28 is further shown as containing a performance metric which has been calculated for each of the sets of training data 306 during the training process. The memory 28 is further shown as containing a mean of all the performance metrics 308 that were calculated for a particular loop and particular artificial intelligence model 302. The memory 28 is further shown as containing a range 312 of all the performance metrics for the particular loop calculated for the particular artificial intelligence model 302. From the mean of the performance metrics 310 for the loop and the range 312 of the performance metrics for the loop the memory is containing a training control limit 314 that has been calculated. The current performance metrics 308 are compared to a training control element from a previous iteration 316 which is also shown as being stored in the memory 28.

Figure 4:
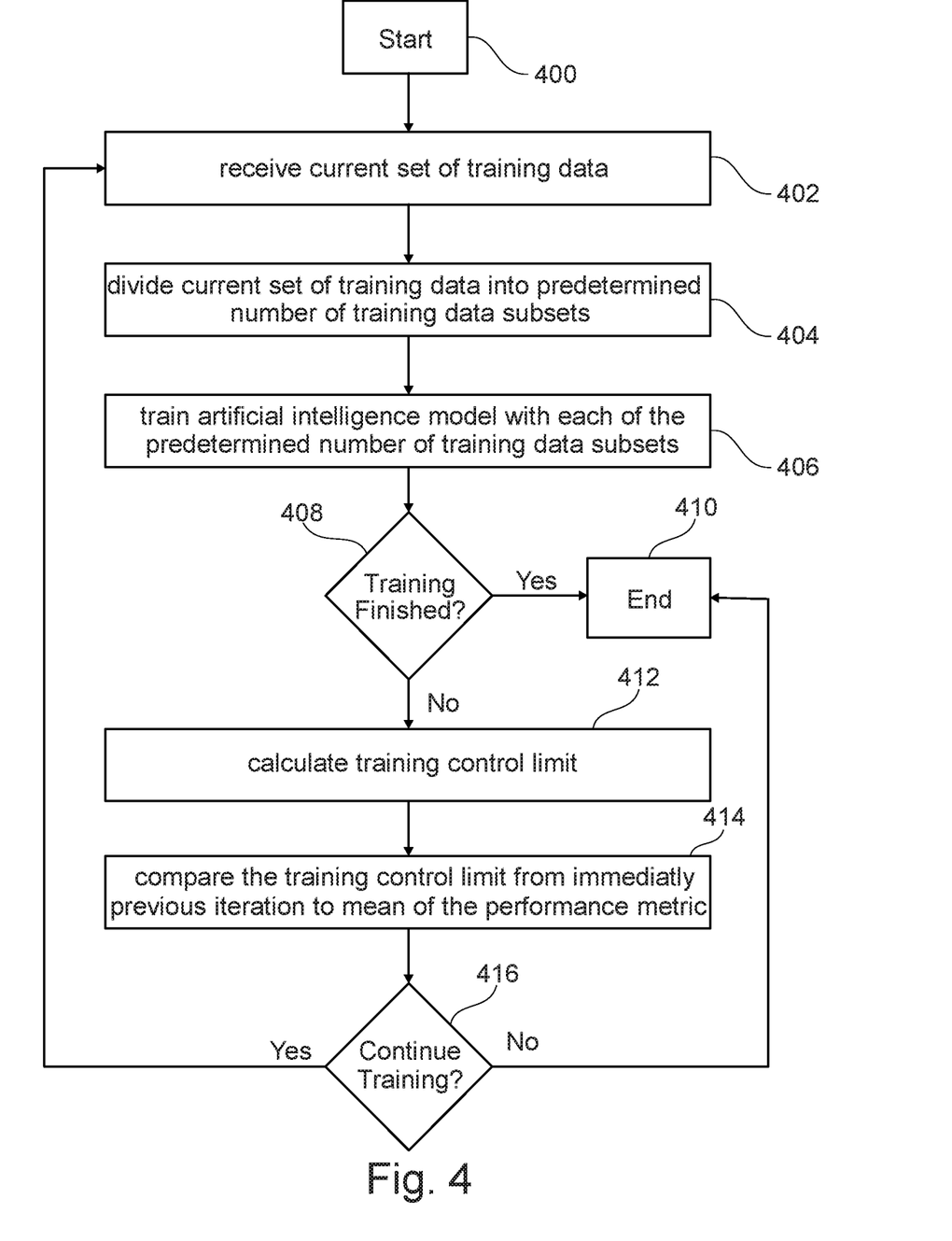
FIG. 4 illustrates a method of operating the computer system of FIG. 3 in accordance with at least one embodiment of the present invention.

FIG. 4 shows a flowchart which illustrates a method of operating the computer system 10 illustrated in FIG. 3. The method starts with the step 400, which is labeled start. The method then proceeds to step 402. In step 402 a current set of training data 304 is received. During each iteration of the loop the current set of training data 304 is replaced. Next, the method proceeds to step 404 where the current set of training data 304 is divided into a predetermined number of training data subsets 306. The predetermined sets of training data 306 may also be referred to as k-folds. Next, in step 406, the artificial intelligence model 302 is trained by sequentially training the artificial intelligence model 302 using training portions of the predetermined number of training data subsets.

After each of the training portions is used a corresponding validation portion is used to calculate a performance metric 308. Next, in step 408, the method proceeds by determining whether the model is fully trained. If the model is indeed fully trained, the method proceeds to step 410 and the method ends. If the model is not fully trained the method proceeds to step 412. In step 412 a training control limit 314 is calculated from a mean of the performance metrics 310 and a range 312 of the performance metrics. Then in step 414 the training control limit 316 from an immediately previous iteration is compared to the mean of the performance metrics 310 for the particular loop and particular model. This is used to determine if the improving performance metric condition is met. The improving performance metric is a measure if the performance of the model is continuing to improve with further training. Next, in step 416, the method then proceeds to determine if the improving performance metric condition has been met at least once within a predetermined number of previous iterations. If the improving performance metric has been met at least once within the predetermined number of previous iterations then further training has improved the artificial intelligence model, and the method proceeds back to step 402 for further training and the current set of training data is replaced with a new current set of training data.

If the improving performance metric has not been met at least once within the predetermined number of previous iterations, the artificial intelligence model is no longer improving with further training, and the training of the model is discontinued. When the training of the model is discontinued, the method proceeds back to step 410 and the training of the artificial intelligence model 302 is stopped.

The method in FIG. 4 can be modified in a variety of ways. In one example, the method is applied to train multiple artificial intelligence models simultaneously. This also may take several different forms. In one example the artificial intelligence models are all trained at the same time, but they are evaluated independently. A training control limit is calculated for each artificial intelligence model separately and this is used to determine if the training of that artificial intelligence model should be stopped. In other examples the training of the artificial intelligence models can be performed competitively. For example, the training control limit is calculated for each loop for each artificial intelligence model separately and then the best training control limit is selected as a global control limit. The data is then compared to the global training control limit from the previous iteration instead of the training control limit so essentially the improvement of the artificial intelligence model is measured against the best performing model of the previous iteration of the loop. If a model is not able to be improving with respect to the best model of the previous iteration for a predetermined number of times, then the training of that particular artificial intelligence model is stopped. This may very rapidly weed out artificial intelligence models which are underperforming relative to the others. This may result in very large computational savings.

Figure 5:
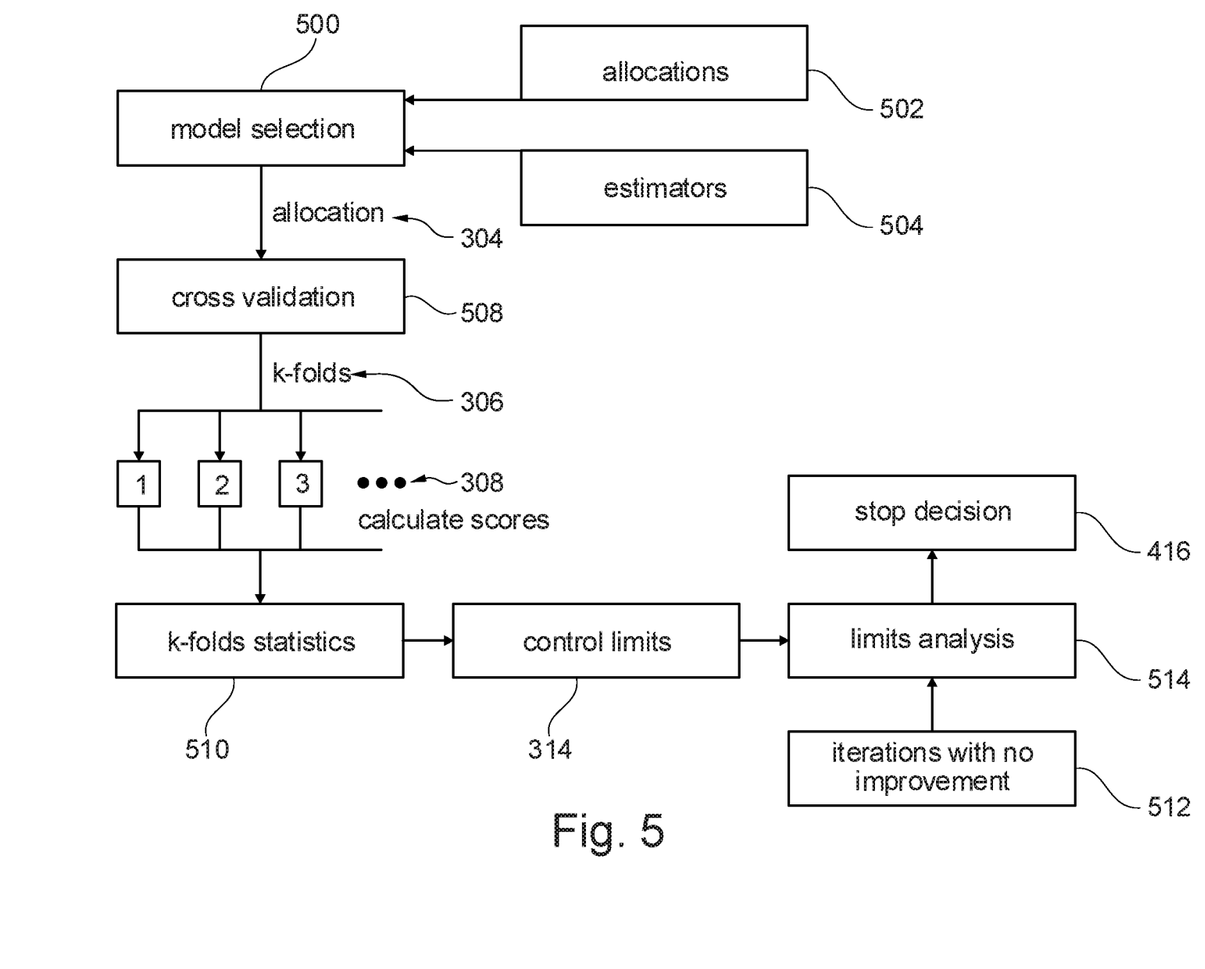
FIG. 5 illustrates an example of a method in accordance with at least one embodiment of the present invention.

FIG. 5 shows a flowchart which illustrates an alternate method of automated training of artificial intelligence models. In some cases, various portions of the method illustrated in FIG. 5 can be interchanged with portions of the method illustrated in FIG. 4. Step 500 shows a step of model selection. This includes providing training data 502. The training data is also referred to collectively as allocations of training data. Step 500 also includes providing a variety of estimators 504. The estimators as referred to herein are the individual artificial intelligence models. One allocation of the allocations is equivalent to the current set of training data 304. During each loop the model then goes through a cross verification process 508. In the cross verification, training and validation are performed, and the allocation or current set of training data 304 is divided into k-folds of data. In some cases, the k-folds of data may be equivalent to the sets of training data 306. During the training a performance metric 308 is calculated for each of the k-folds 306. In step 510 k-fold statistics are calculated. The k-fold statistics may include the mean of all of the performance metrics 308 as well as the range 312 for the performance metrics 308. The k-fold statistics may then be used to calculate the control limit or training control limit 314. The control limits 314 are retained from loop-to-loop and are used in step 514 to compare the training control limit from the previous iteration 316 with the mean of the performance metrics 310. Box 512 represents a function that is used to test if the mean of the performance metrics 310 has shown an improved performance within the last predetermined number of loops. This is then used to provide a stop or continue decision with respect to step 416.

In each iteration the estimator (Artificial intelligence model) from a set of estimators 504 (multiple artificial intelligence models) is evaluated on subsample of data points, also referred to as allocations. An allocation is the current set of training data. The evaluation is done using cross-validation technique. The cross-validation technique is based on splitting data into k-folds (training data subsets); next training and evaluating a model is performed on each of the k-folds.

For each allocation for each estimator there are k metrics calculated (k-folds). Each of the k metrics may correspond to machine learning metrics describing the performance (using a performance metric) of trained model—for example: accuracy, precision, recall, etc.

The process ends when the whole data set (all allocations) are examined giving the recommendation (the most promising estimators) to next stage (in simplification).

The system described below allows the providing of a recommendation much faster based on analysis of on-going allocations and cross-validation results.

The system may comprise one or more of the following stages:

1. Calculate Control Limits: upper and lower for folds scores (metrics) per allocation (i) and estimator (e)

$UCL=mean(folds\_score)+R*A2$ $LCL=mean(folds\_score)-R*A2$, where $R=max(folds\_score)-min(folds\_score)$, $A2$ is from a statistical process control table 2. Next, calculate mean value for next allocation folds scores 3. Analyze the relationship between mean value on allocation (i+j) and estimator (e) and allocation (i), where j=1, . . . , len(allocations) IF UCL>mean value>LCL—it means there is no increase nor decrease in metrics values calculated for (i+j) allocation and estimator (e)

IF mean value>UCL—it means there is improvement in metrics value (model performance/quality) for (i+j) allocation and estimator (e)

IF mean value<LCL—it means there is a degradation in model performance for (i+j) allocation and estimator (e)

4. Repeat the analysis until j=iters_no_improvement. For example, iters_no_improvement=3—that means that next 3 allocations are analyzed. If there will be no improvement for next j (3 in this example) allocations for estimator (e) further exploration of next allocation for this particular estimator (e) is stopped. Another variation is to skip next allocation if the condition of not improving mean metric value is met.

For such data the behavior of the system can be simulated. As an example, an LGBM estimator example was investigated. Light GBM (LGBM) is a gradient boosting framework based on decision tree algorithm The steps are:

1. For particular allocation (500) cross-validate the estimator performance and calculate UCL. In this example, the upper control limit was used as the training control limit.

2. For next allocation (1000) cross-validation results calculate UCL, Mean and do comparative analysis of current mean values and UCL from previous allocation (500). In this example, the improvement detected was 0.71%.

3. For next allocation (1500) cross-validation results calculate UCL, Mean and do comparative analysis of current mean values and UCL from previous allocation (1000). In this example, NO improvement was detected. It is the first iteration without improvement.

4. For next allocation (2000) cross-validation results calculate UCL, Mean and do comparative analysis of current mean values and UCL from previous allocation (1500). In this example, NO improvement has been detected. It is the second iteration without improvement.
5. For next allocation (2500) cross-validation results calculate UCL, Mean and do comparative analysis of current mean values and UCL from previous allocation (2000). In this example, NO improvement has been detected. It is the third iteration without improvement.
6. Check the number of iterations without improvement— if it equals no_iter_improvement parameter (aka window size or predetermined number of previous iterations) STOP the search process for estimator: LGBM
7. REPEAT the same for other estimators (artificial intelligence models).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Various examples may possibly be described by one or more of the following features in the following numbered clauses:

Clause 1. A method of training an artificial intelligence model, said method comprising an iterative training loop, wherein said iterative training loop comprises: receiving a current set of training data, wherein said current set of training data is different from said current set of training data from previous iterations of said iterative training loop; dividing said current set of training data into a predetermined number of training data subsets, wherein each of said predetermined number of training data subsets is divided into a training portion and a validation portion; sequentially training said artificial intelligence model with each of said predetermined number of training data subsets using said training portion, wherein sequentially training said artificial intelligence model comprises calculating a performance metric for said predetermined number of training data subsets using said respective validation portion; calculating a training control limit from a mean of said performance metric for said predetermined number of training data subsets and a range of said performance metric for said predetermined number of training data subsets; and comparing said training control limit from an immediately previous iteration of said iterative training loop to said mean of said performance metric for said predetermined number of training data subsets to determine if an improving performance metric condition is met; wherein said method further comprises halting said iterative training loop unless said improving performance metric condition is not met at least once within a predetermined number of previous iterations.

Clause 2. The method of clause 1, wherein said method further comprises training multiple artificial intelligence models simultaneously using the method of training said artificial intelligence model.

Clause 3. The method of claim 2, wherein said training of said multiple artificial intelligence models is each selected from any one of the following: a neural network, a classifier neural network, a convolutional neural network, a Bayesian neural network, a Bayesian network, a Bayes network, naive Bayes classifiers, belief network, or decision network, a decision trees, a support-vector machine, a regression analysis, and a genetic algorithm.

Clause 4. The method of clause 1 or 2, wherein said method further comprises choosing a global control limit for each iteration of said iterative training loop, wherein said global control limit is selected by choosing said control limit from said iterative training loop that indicates a best performance metric of said multiple artificial intelligence models, wherein said iterative training loop further comprises replacing said training control limit from an immediately previous iteration of said iterative training loop for each of said multiple artificial intelligence models with an immediately previous global control limit from an immediately previous iteration of said iterative training loop.

Clause 5. The method of clause 2 or 3, wherein said training control limit for each of said multiple artificial intelligence models during each iteration of said iterative training loop is calculated separately.

Clause 6. The method of any one of clauses 1 through 5, wherein an increasing value of said performance metric indicates better artificial intelligence model performance, wherein said control limit is calculated as said mean of said performance metric plus said range of said performance metric times a constant.

Clause 7. The method of any one of clauses 1 through 6, wherein a decreasing value of said performance metric indicates better artificial intelligence model performance, wherein said control limit is calculated as said mean of said performance metric minus said range of said performance metric times a constant.

Clause 8. The method of any one of clauses 1 through 7, wherein said control limit is a statistical process control limit.

Clause 9. The method of any one of clauses 1 through 8, wherein said performance metric is selected from any one of the following: accuracy, precision, recall, area under curve metric, true positive rate, true negative rate, false positive rate, sum of said true positive rate and said true negative rate both divided by a total sample size, mean squared error, and F1 score.

Clause 10. The method of any one of clauses 1 through 9, wherein said artificial intelligence model is a convolutional neural network, and wherein said training of said artificial intelligence model is performed using a deep learning algorithm.

Clause 11. The method of any one of clauses 1 through 9, wherein said artificial intelligence model is any one of the following: a neural network, a classifier neural network, a convolutional neural network, a Bayesian neural network, a Bayesian network, a Bayes network, naive Bayes classifiers, belief network, or decision network, a decision trees, a support-vector machine, a regression analysis, and a genetic algorithm.

Clause 12. A computer program product comprising a computer-readable storage medium having computer-readable program code embodied therewith, said computer-readable program code configured to implement said method of any one of clauses 1 through 11.

Clause 13. A computer system comprising: a processor configured for controlling the computer system; and a memory storing machine executable instructions, wherein execution of said instructions causes said processor to perform an iterative training loop for training an artificial intelligence model, wherein said iterative training loop comprises: receiving a current set of training data, wherein said current set of training data is different from said current set of training data from previous iterations of said iterative training loop; dividing said set of training data into a predetermined number of training data subsets, wherein each of said predetermined number of training data subsets is divided into a training portion and a validation portion; sequentially training said artificial intelligence model with each of said predetermined number of training data subsets using said training portion, wherein sequentially training said artificial intelligence model comprises calculating a performance metric for each of said predetermined number of training data subsets using said respective validation portion; calculating a training control limit from a mean of said performance metric for each of said predetermined number of training data subsets and a range of said performance metric for each of said predetermined number of training data subsets; and comparing said training control limit from an immediately previous iteration of said iterative training loop to said mean of said performance metric for each of said predetermined number of training data subsets to determine if an improving performance metric condition exists; wherein said method further comprises halting said iterative training loop unless said improving performance metric condition does not exists at least once within a predetermined number of previous iterations.

Clause 14. The computer system of clause 13, wherein execution of said instructions causes said processor to train multiple artificial intelligence models simultaneously using said method of training said artificial intelligence model.

Clause 15. The computer system of clause 14, wherein execution of said instructions causes said processor to choose a global control limit for each iteration of said iterative training loop, wherein execution of said instructions causes said processor to choose said control limit from said iterative training loop that indicates a best performance metric, wherein said iterative training loop further comprises replacing said training control limit from an immediately previous iteration of said iterative training loop for each of said multiple artificial intelligence models with an immediately previous global control limit.

Clause 16. The computer system of clause 14, wherein said training control limit for each of said multiple artificial intelligence models during each iteration of said iterative training loop is calculated separately.

Clause 17. The computer system of any one of clauses 13 through 16, wherein said performance metric is selected from any one of the following: accuracy, precision, recall, area under curve metric, true positive rate, true negative rate, false positive rate, sum of said true positive rate and said true negative rate both divided by a total sample size, mean squared error, and F1 score.

Clause 18. The computer system of any one of clauses 13 to 17, wherein said artificial intelligence model is any one of the following: a neural network, a classifier neural network, a convolutional neural network, a Bayesian neural network, a Bayesian network, a Bayes network, naive Bayes classifiers, belief network, or decision network, a decision trees, a support-vector machine, a regression analysis, and a genetic algorithm.

Clause 19. A computer program product, said computer program product comprising a computer readable storage medium having stored thereon an artificial intelligence model trained according to said method of any one of clauses 1 through 11.

Clause 20. A memory for storing data for access by an application program being executed on a data processing system, comprising: an artificial intelligence model trained according to said method of any one of clauses 1 through 11.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of training an artificial intelligence model, said method comprising an iterative training loop, wherein said iterative training loop comprises:

receiving a current set of training data, wherein said current set of training data is different from training data from previous iterations of said iterative training loop;

dividing said current set of training data into a plurality of training data subsets, each training data subset having a respective training portion and a respective validation portion;

sequentially training an artificial intelligence model with said training data subsets using said respective training portions, wherein sequentially training said artificial intelligence model includes calculating a performance metric for each training data subset of said training data subsets using said respective validation portion after training using said respective training portion;

comparing performance metrics from a previous iteration of said iterative training loop to said calculated performance metrics for said training data subsets to determine whether an improving performance condition is met; and halting said iterative training loop responsive to determining the improving performance metric condition is met at least once within a predetermined number of previous iterations.

2. The method of claim 1, further comprising training multiple artificial intelligence models simultaneously using said iterative training loop.

3. The method of claim 1, wherein the comparing performance metrics comprises comparing a control limit of a previous iteration of said iterative training loop to a calculated current control limit, wherein the control limits are calculated based on a mean of said performance metrics during a respective iteration and a range of said performance metrics during said respective iteration.

4. The method of claim 1, wherein said performance metric is selected from the group consisting of: accuracy, precision, recall, area under curve metric, true positive rate, true negative rate, false positive rate, sum of said true positive rate and said true negative rate both divided by a total sample size, mean squared error, and F1 score.

5. The method of claim 1, wherein said artificial intelligence model is a convolutional neural network, and wherein said training of said artificial intelligence model is performed using a deep learning algorithm.

6. The method of claim 1, wherein said artificial intelligence model is selected from the group consisting of: a neural network, a classifier neural network, a convolutional neural network, a Bayesian neural network, a Bayesian network, a Bayes network, naive Bayes classifiers, belief network, or decision network, a decision trees, a support-vector machine, a regression analysis, and a genetic algorithm.

7. The method of claim 2, wherein each of said multiple artificial intelligence models is selected from the group consisting of: a neural network, a classifier neural network, a convolutional neural network, a Bayesian neural network, a Bayesian network, a Bayes network, naive Bayes classifiers, belief network, or decision network, a decision trees, a support-vector machine, a regression analysis, and a genetic algorithm.

8. A computer system comprising:
a processor configured for controlling the computer system; and
a memory storing machine executable instructions, wherein execution of said instructions causes said processor to perform an iterative training loop, wherein said iterative training loop comprises:
receiving a current set of training data, wherein said current set of training data is different from training data from previous iterations of said iterative training loop;
dividing said current set of training data into a plurality of training data subsets, each training data subset having a respective training portion and a respective validation portion;
sequentially training an artificial intelligence model with said training data subsets using said respective training portions, wherein sequentially training said artificial intelligence model includes calculating a performance metric for each training data subset of said training data subsets using said respective validation portion after training using said respective training portion;
comparing performance metrics from a previous iteration of said iterative training loop to said calculated performance metric for said training data subsets to determine whether an improving performance condition is met; and
halting said iterative training loop responsive to determining the improving performance metric condition is met at least once within a predetermined number of previous iterations.

9. The computer system of claim 8, wherein execution of said instructions further causes said processor to train multiple artificial intelligence models simultaneously using said iterative training loop.

10. The computer system of claim 8, wherein the comparing performance metrics comprises comparing a control limit of a previous iteration of said iterative training loop to a calculated current control limit, wherein the control limits are calculated based on a mean of said performance metrics during a respective iteration and a range of said performance metrics during said respective iteration.

11. A method of training an artificial intelligence model, said method comprising an iterative training loop, wherein said iterative training loop comprises:
receiving a current set of training data, wherein said current set of training data is different from training data from previous iterations of said iterative training loop;
dividing said current set of training data into a plurality of training data subsets, each training data subset having a respective training portion and a respective validation portion;
sequentially training an artificial intelligence model with said training data subsets using said respective training portions, wherein sequentially training said artificial intelligence model includes calculating a performance metric for each training data subset of said training data subsets using said respective validation portion after training using said respective training portion;
calculating a current training control limit based, at least in part, on the calculated performance metrics for said training data subsets;
comparing a training control limit from a previous iteration of said iterative training loop to the calculated current training control limit to determine whether an improving performance metric condition is met; and
halting said iterative training loop responsive to determining the improving performance metric condition is met at least once within a predetermined number of previous iterations.

12. The method of claim 11, wherein said method further comprises training multiple artificial intelligence models simultaneously using said iterative training loop.

13. The method of claim 12, wherein said method further comprises choosing a global control limit for each iteration of said iterative training loop, wherein said global control limit is selected by choosing said control limit from said iterative training loop that indicates a best performance metric of said multiple artificial intelligence models, and wherein said iterative training loop further comprises replacing said training control limit from an immediately previous iteration of said iterative training loop for each of said multiple artificial intelligence models with an immediately previous global control limit from an immediately previous iteration of said iterative training loop.

14. The method of claim 12, wherein said training control limit for each of said multiple artificial intelligence models during each iteration of said iterative training loop is calculated separately.

15. The method of claim 11, wherein an increasing value of said performance metric indicates better artificial intelligence model performance, wherein said control limit is calculated as a mean of said performance metric plus a range of said performance metric times a constant.

16. The method of claim 11, wherein a decreasing value of said performance metric indicates better artificial intelligence model performance, wherein said control limit is calculated as a mean of said performance metric minus a range of said performance metric times a constant.

17. The method of claim 11, wherein said control limit is a statistical process control limit.

18. The method of claim 11, wherein comparing a training control limit from a previous iteration of said iterative training loop to a mean of said performance metric for said training data subsets to determine whether an improving performance metric condition is met includes comparing a training control limit from an immediately previous iteration of said iterative training loop to said mean of said performance metric for said training data subsets.

19. A computer program product comprising:
one or more computer readable storage media and program instructions stored on the one or more computer readable storage media, the program instructions comprising instructions to perform an iterative training loop, wherein the iterative training loop comprises:
receiving a current set of training data, wherein said current set of training data is different from training data from previous iterations of said iterative training loop;
dividing said current set of training data into a plurality of training data subsets, each training data subset having a respective training portion and a respective validation portion;
sequentially training an artificial intelligence model with said training data subsets using said respective training portions, wherein sequentially training said artificial intelligence model includes calculating a performance metric for each training data subset of said training data subsets using said respective validation portion after training using said respective training portion;

calculating a current training control limit based, at least in part, on the calculated performance metrics for said training data subsets;

comparing a training control limit from a previous iteration of said iterative training loop to the calculated current training control limit to determine whether an improving performance metric condition is met; and halting said iterative training loop responsive to determining the improving performance metric condition is met at least once within a predetermined number of previous iterations.

20. A computer system comprising:

a processor configured for controlling the computer system; and a memory storing machine executable instructions, wherein execution of said instructions causes said processor to perform an iterative training loop, wherein said iterative training loop comprises:

receiving a current set of training data, wherein said current set of training data is different from training data from previous iterations of said iterative training loop;

dividing said current set of training data into a plurality of training data subsets, each training data subset having a respective training portion and a respective validation portion;

sequentially training an artificial intelligence model with said training data subsets using said respective training portions, wherein sequentially training said artificial intelligence model includes calculating a performance metric for each training data subset of said training data subsets using said respective validation portion after training using said respective training portion;

calculating a current training control limit based, at least in part, on the calculated performance metric for said training data subsets;

comparing a training control limit from a previous iteration of said iterative training loop to the calculated current training control limit to determine whether an improving performance metric condition is met; and halting said iterative training loop responsive to determining the improving performance metric condition is met at least once within a predetermined number of previous iterations.

21. The computer system of claim 20, wherein execution of said instructions causes said processor to train multiple artificial intelligence models simultaneously using said iterative training loop.

22. The computer system of claim 21, wherein execution of said instructions causes said processor to choose a global control limit for each iteration of said iterative training loop, wherein execution of said instructions causes said processor to choose said control limit from said iterative training loop that indicates a best performance metric, wherein said iterative training loop further comprises replacing said training control limit from an immediately previous iteration of said iterative training loop for each of said multiple artificial intelligence models with an immediately previous global control limit.

23. The computer system of claim 21, wherein said training control limit for each of said multiple artificial intelligence models during each iteration of said iterative training loop is calculated separately.

24. The computer system of claim 21, wherein said performance metric is selected from the group consisting of: accuracy, precision, recall, area under curve metric, true positive rate, true negative rate, false positive rate, sum of said true positive rate and said true negative rate both divided by a total sample size, mean squared error, and F1 score.

25. The computer system of claim 21, wherein said artificial intelligence model is selected from the group consisting of: a neural network, a classifier neural network, a convolutional neural network, a Bayesian neural network, a Bayesian network, a Bayes network, naive Bayes classifiers, belief network, or decision network, a decision trees, a support-vector machine, a regression analysis, and a genetic algorithm.

* * * * *